United States Patent [19]

Turner et al.

[11] Patent Number: 4,552,452

[45] Date of Patent: Nov. 12, 1985

[54] DAYLIGHT ENLARGER

[75] Inventors: George F. A. M. Turner, Blackmore; Michael H. Moore, Ilford; Ernest J. Twigger, Hornchurch, all of England

[73] Assignee: Ciba-Geigy AG, Basel, Switzerland

[21] Appl. No.: 510,700

[22] Filed: Jul. 5, 1983

[30] Foreign Application Priority Data

Jul. 7, 1982 [GB] United Kingdom ................. 8219622

[51] Int. Cl.⁴ ........................ G03B 27/32; G03B 27/52
[52] U.S. Cl. ..................................... 355/27; 354/308; 354/331
[58] Field of Search ....................... 355/21, 27, 45, 44; 354/308, 310, 321, 331

[56] References Cited

U.S. PATENT DOCUMENTS 2,405,233 8/1946 Peckham .............................. 354/331
4,053,219 10/1977 Damm et al. ......................... 355/27
4,452,527 6/1984 Turner et al. ......................... 355/45

Primary Examiner—Russell E. Adams
Assistant Examiner—Brian W. Brown
Attorney, Agent, or Firm—Harry Falber

[57] ABSTRACT

A daylight enlarger of the enclosed image-framing area type wherein the image framing area is enclosed by solid curtain walls having at least one light-tight armhole therein and wherein part of one of the walls encompasses in a light-tight manner a removable actinic light opaque processing dish having a lid which when the dish is present in the wall can be opened to enable print material to be placed therein and which can be closed from inside the enclosed image framing area.

4 Claims, 5 Drawing Figures

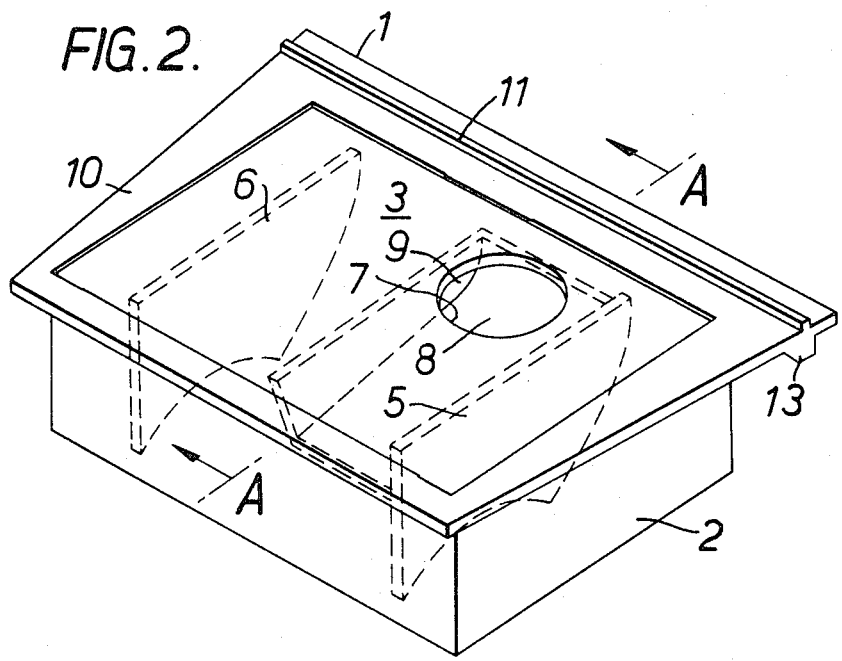
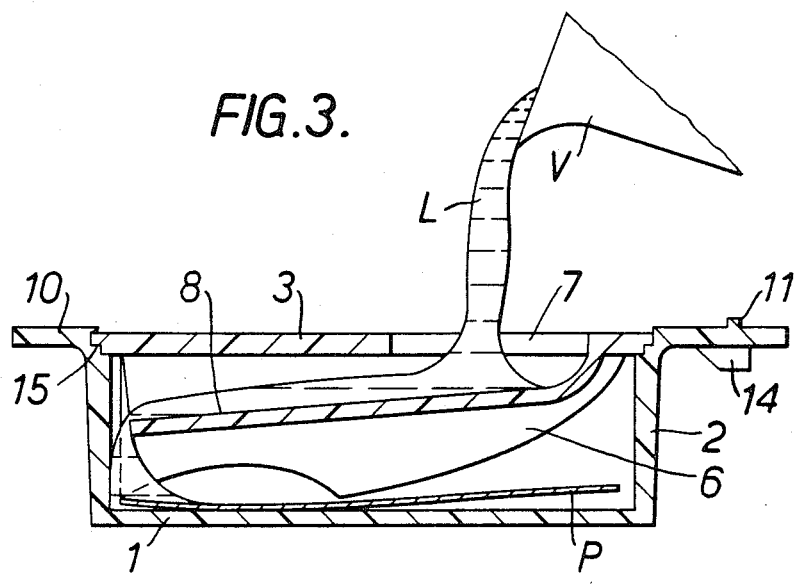

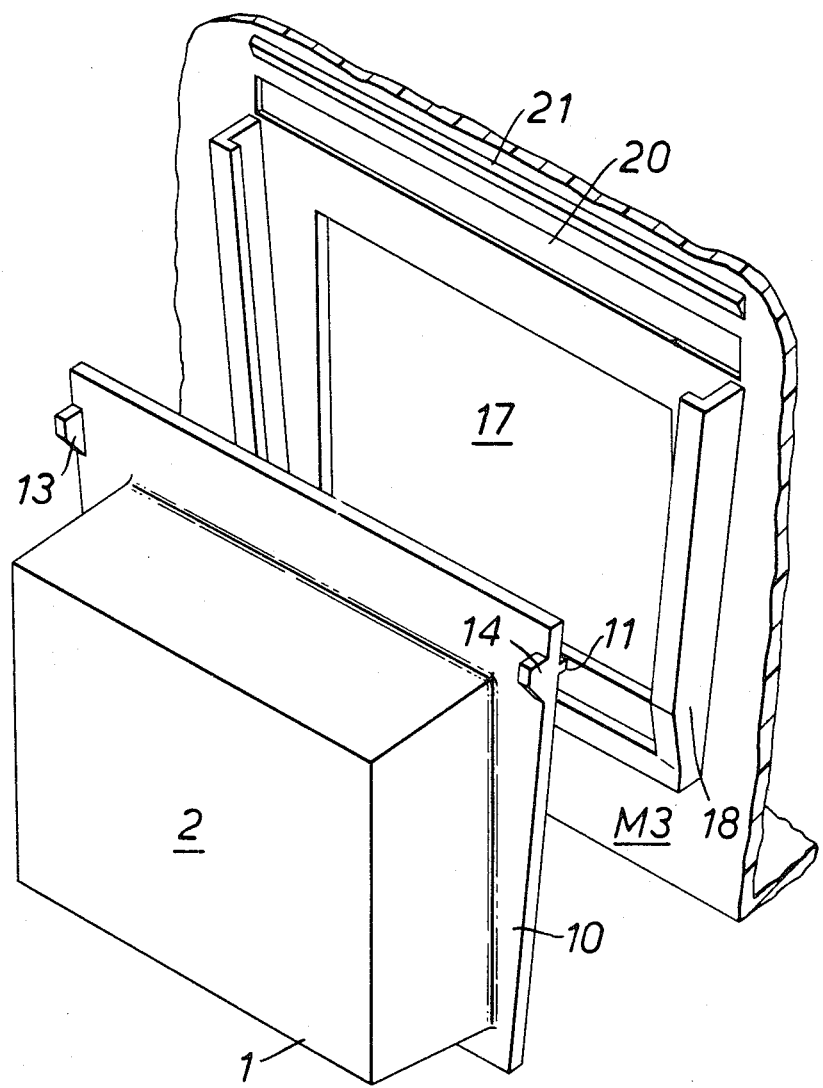

DAYLIGHT ENLARGER

This invention relates to a photographic enlarger of the enclosed image framing area type which can be used in daylight conditions.

In recent years it has become difficult to prepare in an average house an area which can be blacked-out sufficiently for it to be used as a dark-room in which negatives can be printed on to photosensitive print material. A number of enlargers have been marketed in which the lamphouse and transparency holder are mounted on a box or tent-like structure which encloses the image framing area where the image of the transparency is focussed to composed the picture and expose the print material. Sometimes provision is made inside enclosed image framing area to house a processing dish but this means an awkward shaped enclosed area to accommodate such a dish. Alternatively the enclosed area may have a slot through which the exposed print material may be passed to an adjoining processing dish located outside the enclosed image framing area. However it has proved difficult to render such transfer means light-tight. Moreover because of the limited space in the enclosed area it has proved difficult to post the exposed print through a slot in the wall of the enclosed area because of the limited freedom of action of an arm in an arm-hole in the walls of the enclosed area.

It is the object of the present invention to provide a photographic enlarger of the enclosed image framing area type in which an exposed print can be placed easily and in a light-tight manner in a processing dish.

Therefore according to the present invention there is provided a daylight enlarger of the enclosed image-framing area type wherein the image framing area is enclosed by solid curtain walls having at least one light-tight arm hole therein and wherein part of one of the walls encompasses in a light-tight manner a removable actinic light opaque processing dish having a lid which when the dish is present in the wall can be opened to enable print material to be placed therein and which can be closed from inside the enclosed image framing area.

Preferably the lid of the processing dish comprises means to enable processing liquid to be poured into the dish when the lid is closed.

In one embodiment of the invention the lid of the processing dish is composed of a transparent plastics material which comprises a filter dye so that the process of development can be seen through the lid of the dish. Also the side walls and bottom of the dish can be composed of similar material.

Preferably the processing dish has a wide flange surrounding the liquid container and the wall of the enlarger which encompasses the processing dish comprises a flange locating member with a return. Preferably camming members are present on the top edge of the underside of the flange on the container. Thus when the flange of the container is slipped into the flange locating member it is held therein in a light-tight manner. Most preferably the flange is shaped as a slight dove tail and the flange locating member is similarly shaped, the top edge of the flange which is not enclosed by the flange locating member being longer than its opposite edge.

Preferably when the lid of the processing dish is closed it rests in a light-tight manner within the flanges of the container, when in position in the enlarger the lid is opened by pulling down its top edge of the lid so that it rests on lid support members attached to the side wall of the enlarger to the outside of which the processing dish is attached, the lid pivoting on its bottom edge.

Preferably the means to enable processing liquid to be poured into the processing dish is an aperture with a trough beneath it which extends well beyond the aperture so that actinic light cannot reach a print located in the processing dish below the trough. Most preferably the said aperture is big enough to allow an operator's finger to use the aperture to partially open the lid when the processing dish is in position encompassed by a curtain wall of the enlarger.

Most preferably the processing dish is encompassed by a curtain wall of the enlarger which is opposite the wall which comprises the arm holes.

The accompanying drawings will serve to illustrate the invention.

FIG. 2 is a top perspective view of the processing dish.

FIG. 3 is a sectional view of the dish of FIG. 1. taken along the line A—A.

FIG. 4 is a bottom perspective view of the processing dish of FIG. 1. showing it adjacent to an aperture in the back wall of an enclosed image framing area photographic enlarger.

In all the figures the same numbers have the same signification.

Figure 1:
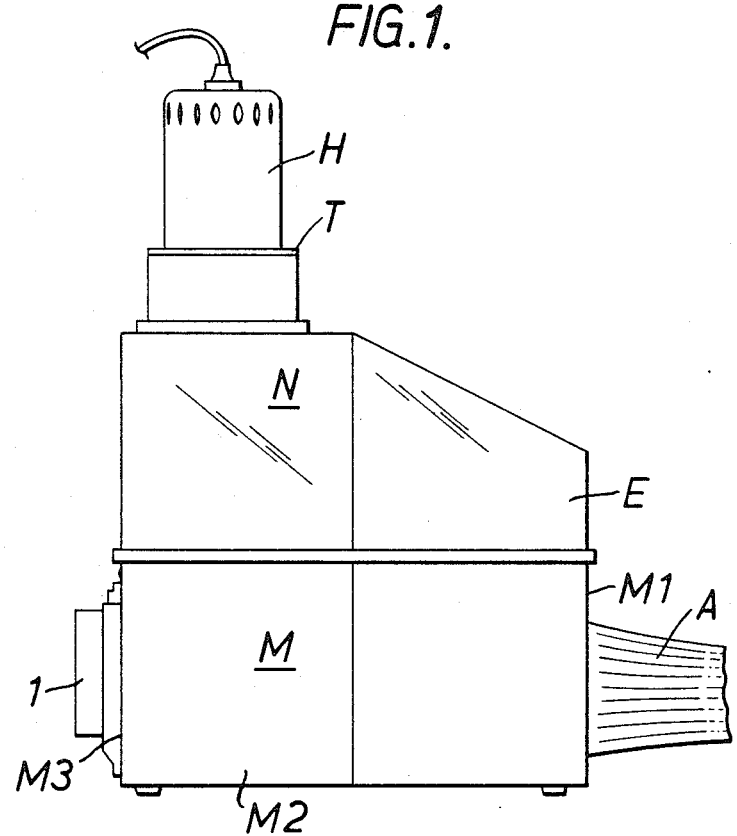
FIG. 1 is a side elevation of a photographic enlarger according to the present invention which has encompassed in one curtain wall a photographic processing dish.

In FIG. 1 a photographic enlarger E comprises a lower box-like section M which is composed of light-opaque pigmented polystyrene. Mounted on section M is a removable upper section N which is composed of polystyrene dyed dark red. Mounted on section N is a removable lamphouse H which has beneath it a transparency holder T. Located beneath the transparency holder T but not visible in this figure is a fixed focus lens.

Section M is composed of four curtain walls M1, M2, M3 and M4 (M4 being hidden by M2). Present in curtain wall M1 are two light-tight arm holes A (only one of which is visible). Present in curtain wall M3 is a photographic processing dish 1.

In FIG. 2 the photographic processing dish 1 comprises a liquid container portion 2 which is composed of polystyrene dyed dark red and a lid portion 3 which fits into the top of the container. (This is shown more clearly in FIG. 3).

The lid 3 is also composed of polystyrene dyed dark red.

Depending from the underside of the lid 3 are two plates 5 and 6 which are also composed of polystyrene dyed dark red.

Present in the lid 3 is an aperture 7 which is above a trough 8 which has as its side walls a panel 9 also composed of polystyrene dyed dark red and panel 5.

Figure 5:
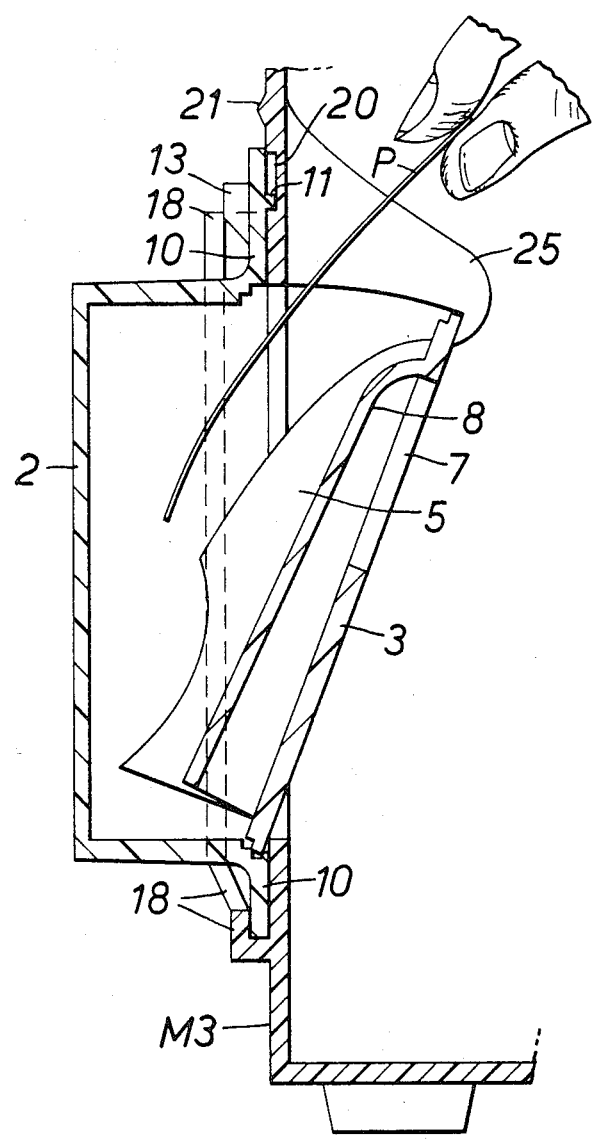
FIG. 5 is a sectional view of the processing dish of FIG. 1. in position in the aperture of the enlarger of FIG. 3 with the lid of the dish partially open.

Surrounding the container 2 is a flange 10. Located along one portion of the flange on the upper side is an abutment member 11 (the function of which is shown in FIG. 4). Located on the same portion of the flange but on the lower side is camming member 13. There are in fact two camming members 13 and 14 as shown in FIG. 4. (Their function is shown in FIG. 5).

In FIG. 3 the lid 3 is shown firmly closed in a light-tight manner on the container 2 sitting in a double stepped groove 15.

In FIG. 3 processing liquid L is shown pouring from a vessel V. It falls through aperture 7 to trough 8 and from thence down into the bottom of the container 2 flowing over a sheet P of photographic print material which is present at the bottom of the container 2.

The extension of the trough 8 well beyond the aperature 7 prevents unfiltered light from reaching the photographic sheet material P.

In FIG. 4 the underside of the container 2 of the processing dish 1 is shown. In this figure the processing dish 1 is about to be inserted into an aperture 17 located in curtain wall M3 of the enlarger E.

The means for holding the processing dish 1 in position on wall M3 comprise a flange locating member 18 with a return located on both sides of and below the aperture 17. Located above the aperture 17 is an elongated recess 20. Located above the recess 20 is an abutment member 21. Both the flange 10 on the container and the flange location member 18 are slightly dove tailed in shape to ease insertion of the flange of the container into the flange location member 18.

In FIG. 5 the processing dish 1 is shown in position in the side wall M3 of the enlarger E.

The flange 10 of the container is encompassed in the flange locating member 18 on the said wall M3. The abutment member 11 on flange 10 of the container is located in the recess 20 in the side wall M3. The two camming members 13 and 14 are partially located within the top ends of the flange locating member 18. Thus the container 2 is held in a light-tight manner on the side wall M3 over the aperture 17.

Lid 3 of the dish 1 has been opened and its top edge rests against lid retaining members 25 which are mounted on the inside of wall M3 of the enlarger (only one of which is shown).

Shown being passed into the processing dish between the lid retaining members 25 is a sheet of exposed photographic print material P.

Thus in operation the empty processing dish as shown in FIG. 2 is offered-on to the enlarger E as shown in FIG 5. The abutment member 21 serves to guide the flange 10 of the container 2 down into the flange location member 18 and to locate the abutment member 11 into the recess 20.

When the processing dish is firmly attached to the side wall M3 the enlarger is then in the state as shown in FIG. 1 and ready for use. The operator has opened the lid 3 of the processing dish 1 by using the aperture 7 which is wide enough to allow a finger to be inserted therein. A transparency is placed in the transparency holder T and the lamp in lamphouse H activated to focus an image in the framing area at the base of enlarger E. This image can be seen through the semi-transparent lid N of the enlarger. When the picture has been composed the lamp is turned off and a sheet of photographic print material is taken from a light-tight container present within the curtain walls of the enlarger. This is placed in the framing area by an operator's hands present in the light-tight arm holes A and the lamp is turned on. The photographic material is exposed for the requisite period and the lamp turned off. The operator then slips the sheet of exposed photographic print material P into the processing dish 1 as shown in FIG. 5 so that its emulsion face will be upwards when the sheet is lying on the bottom of the container 2.

Lid 3 of the dish 1 is then closed by the operator and the dish 1 is removed from the wall M3 using the abutment member 21 to ensure that the abutment member 11 on the container is clear of the recess 20.

Then as shown in FIG. 3 processing liquid L is poured from a vessel V into the processing dish 1 via the aperture 7 and the trough 8. The tip of the panel 6 (and also panel 5 but not shown) causes the sheet P of photographic material to lie flat on the bottom of the container 2. As the liquid L falls off the trough 8 it floods over the surface of the sheet P of photographic print material. When sufficient liquid has been added to the container 2 the processing dish 1 can be rocked from side to side to cause agitation of the processing liquid L in the container. The panels 5 and 6 help to agitate this liquid. When the image fully developed as can be seen through the body of the processing dish 1 the lid 3 is removed and either further processing for example fixing is carried out after removal of the liquid L or if the liquid L is a monobath the sheet P is then washed.

Both the walls of the container 2 and the lid 1 are sufficiently light transparent to enable the operator to view the image on the sheet P as it develops. However as the walls and lid 3 are composed of a light-filtering material, i.e. the red dye present in the polystyrene, the light which passes through does not affect the print material and further expose it.

It is to be understood that the processing dish which is present in the side wall M3 of the enlarger E need not be light transparent but as the processing is carried out in daylight preferably to prevent over or underdevelopment it is light transparent to nonactinic light.

We claim:

1. In a daylight enlarger of the enclosed image-framing type which comprises a lamphouse, an enclosed image framing area, a transparency holder and an enlarging lens mounted over the image-framing area and which is enclosed by solid curtain walls having at least one light-tight arm-hole therein, the improvement comprising an actinic light opaque processing dish removably positioned in a light-tight manner in a portion of one of the solid curtain walls in communication with the image framing area, said positioning enabling the dish to be removed from the wall from outside the enlarger and to form part of the curtain wall during exposure, said dish having a movable lid with an upper edge and a lower pivoting edge thereon which lid can be opened to enable print material to be inserted into said dish and be closed from inside the enclosed image framing area when said dish is positioned in said curtain wall.

2. The daylight enlarger according to claim 1, wherein the processing dish has a wide flange around its periphery and the wall of the enlarger which contains the processing dish has on its outside a flange locating member to engage the flange of the processing dish and thereby retain it in light-tight manner.

3. The daylight enlarger of claim 1, wherein lid-support members are attached to the inner surface of the wall retaining the dish to engage the upper edge of the lid when the lid is in an open position.

4. The daylight enlarger of claim 1, wherein the lid has an aperture therethrough to facilitate introduction of liquid into the dish and opening of the lid.

* * * * *